United States Patent
Okumoto et al.

(10) Patent No.: US 9,316,306 B2
(45) Date of Patent: Apr. 19, 2016

(54) SHIFTING DEVICE FOR VEHICLE

(71) Applicants: TOYOTA JIDOSHA KABUSHIKI KAISHA, Toyota-shi, Aichi-ken (JP); KABUSHIKI KAISHA TOKAI RIKA DENKI SEISAKUSHO, Niwa-gun, Aichi (JP); TSUDA INDUSTRIES CO., LTD., Kariya-shi, Aichi-ken (JP); MANNOH INDUSTRIAL CO., LTD., Anjo, Aichi (JP)

(72) Inventors: Ryuichi Okumoto, Nisshin (JP); Masaki Kobayashi, Komaki (JP); Yasunori Takeuchi, Chita-gun (JP); Naotaka Nishikawa, Anjo (JP); Makoto Yoshida, Takahama (JP)

(73) Assignees: TOYOTA JIDOSHA KABUSHIKI KAISHA, Toyota (JP); KABUSHIKI KAISHA TOKAI RIKA DENKI SEISAKUSHO, Niwa-gun (JP); TSUDA INDUSTRIES CO., LTD., Kariya (JP); MANNOH INDUSTRIAL CO., LTD., Anjo (JP)

( * ) Notice: Subject to any disclaimer, the term of this patent is extended or adjusted under 35 U.S.C. 154(b) by 0 days.

(21) Appl. No.: 14/643,524

(22) Filed: Mar. 10, 2015

(65) Prior Publication Data

US 2015/0260276 A1 Sep. 17, 2015

(30) Foreign Application Priority Data

Mar. 14, 2014 (JP) ................................. 2014-052783

(51) Int. Cl.
| | |
|---|---|
| *F16H 59/10* | (2006.01) |
| *F16H 59/02* | (2006.01) |
| *G05G 5/02* | (2006.01) |
| *F16H 61/24* | (2006.01) |

(52) U.S. Cl.
CPC ................ *F16H 59/10* (2013.01); *F16H 59/02* (2013.01); *G05G 5/02* (2013.01); *F16H 2059/0269* (2013.01); *F16H 2061/242* (2013.01); *Y10T 74/20165* (2015.01)

(58) Field of Classification Search
CPC .... F16H 59/10; F16H 2059/0269; G05G 5/02
See application file for complete search history.

(56) References Cited

U.S. PATENT DOCUMENTS

| | | | | |
|---|---|---|---|---|
| 1,330,912 | A | * | 2/1920 | Short ........................... 74/473.3 |
| 1,911,322 | A | * | 5/1933 | Knapp et al. .................. 74/473.3 |
| 4,333,360 | A | | 6/1982 | Simmons |
| 2005/0139031 | A1 | * | 6/2005 | Giefer et al. ................ 74/473.15 |
| 2015/0260275 | A1 | * | 9/2015 | Okumoto et al. ........... 74/473.34 |

FOREIGN PATENT DOCUMENTS

| | | |
|---|---|---|
| JP | S59-133824 U | 9/1984 |
| JP | 2002-254944 A | 9/2002 |
| JP | 2015-003614 A | 1/2015 |

OTHER PUBLICATIONS

Partial Translation of Jan. 26, 2016 Office Action issued in JP2014-052783.

* cited by examiner

*Primary Examiner* — Terence Boes
(74) *Attorney, Agent, or Firm* — Oliff PLC

(57) ABSTRACT

In a shifting device for a vehicle, inner walls of a guide groove of a main body which are opposed to each other with a guide protrusion interposed therebetween are parallel to each other. The guide protrusion is formed with a width dimension that is reduced from a given position toward a proximal end thereof, so that an angle formed between a line that is parallel to a center axis of the guide protrusion and is extended from the given position toward the proximal end of the guide protrusion as an extension of a line on a side face of a distal end portion of the guide protrusion, and a line on a side face of the proximal end portion of the guide protrusion extending from the given position, becomes equal to a given angle. Thus, the side face of the proximal end portion of the guide protrusion is prevented from strongly contacting with the inner wall of the guide groove which is opposed to the side face, and stress is prevented from being concentrated in the guide protrusion.

5 Claims, 7 Drawing Sheets

SHIFTING DEVICE FOR VEHICLE

INCORPORATION BY REFERENCE

The disclosure of Japanese Patent Application No. 2014-052783 filed on Mar. 14, 2014 including the specification, drawings and abstract is incorporated herein by reference in its entirety.

BACKGROUND OF THE INVENTION

1. Field of the Invention

The invention relates to a shifting device for a vehicle, and in particular to a technology for preventing breaking of a guide protrusion that protrudes from a spherical proximal end portion of a shift lever of the vehicle, so as to prevent rotation of the shift lever about its axis.

2. Description of Related Art

It has been proposed to provide a shift lever of a vehicular shifting device with guide protrusions that protrude from a spherical proximal end portion of the shift lever in shift directions and/or select directions, so as to prevent the shift lever from rotating about its axis. One example of this type of vehicular shifting device is described in Japanese Patent Application Publication No. 2002-254944 (JP 2002-254944A).

The vehicular shifting device described in JP 2002-254944 A principally consists of a shift lever and a holder. The shift lever has a knob in its distal end portion, and a spherical proximal end portion in its proximal end portion, and the spherical proximal end portion is provided with four guide protrusions that protrude in shift directions and select directions, respectively. The holder has a circular hole in which the spherical proximal end portion is slidably supported, and four guide grooves provided at positions corresponding to the guide protrusions, respectively. The guide grooves serve to guide the guide protrusions so as to permit the shift lever to be operated in its operating direction, when the shift lever is operated in one of the shift positions and select positions.

In the vehicular shifting device of JP 2002-254944 A, the four guide protrusions and the corresponding four guide grooves serve to curb or inhibit rotation of the shift lever about its axis, namely, rotation of the lever in the twisting direction of the knob, and the movement of the shift lever is appropriately supported when the shift lever is operated in the shift direction or select direction.

In order to curb rotation of the shift lever around its axis, it is only required to provide a guide protrusion that protrudes in any one of the four directions, i.e., the shift directions and the select directions, and provide the holder with a guide groove that guides the guide protrusion. Thus, it may be considered to provide only one guide protrusion and one guide groove, for reduction of the number of components. The vehicular shifting device thus constructed has one guide protrusion that protrudes in one of the shift directions and selected directions from the spherical proximal end portion of the shift lever, and one guide groove that guides the guide protrusion, and is thus arranged to permit the shift lever to be operated in the shift directions and select directions.

SUMMARY OF THE INVENTION

However, in the vehicular shifting device constructed as described above, when the shift lever is operated in a direction that intersects with the protruding direction of the guide protrusion, the spherical proximal end portion is displaced relative to the holder, in a direction opposite to the operating direction of the shift lever. As a result, a proximal end portion of the guide protrusion and a side wall of the guide groove may strongly interfere with each other, and stress may be concentrated in the proximal end portion of the guide protrusion.

The invention provide a vehicular shifting device in which a guide protrusion protrudes from a spherical proximal end portion of a shift lever in one of operating directions of the lever, so as to curb rotation of the shift lever about its axis, wherein stress is prevented from being concentrated in the guide protrusion due to its contact with a wall of a guide groove provided in the holder when the shift lever is operated.

A shifting device for a vehicle according to one aspect of the invention includes a shift lever, and a main body. The shift lever is operable in a shift direction and a select direction that intersects with the shift direction, and the shift lever includes a spherical proximal end portion. The main body has a circular hole, and holds the shift lever in the circular hole. The shift lever includes a guide protrusion, and the guide protrusion is configured to inhibit rotation of the shift lever about an axis thereof. The guide protrusion protrudes from the spherical proximal end portion in one direction of the shift direction and the select direction. The main body includes an operating direction guide groove, and the operating direction guide groove guides the guide protrusion so as to permit operation of the shift lever when the shift lever is operated. When the shift lever is in a neutral position, an interval between a proximal end portion of the guide protrusion and an inner wall of the operating direction guide groove which is opposed to the proximal end portion is larger than an interval between a distal end portion of the guide protrusion and an inner wall of the operating direction guide groove which is opposed to the distal end portion.

According to the vehicular shifting device, the guide protrusion is provided on the spherical proximal end portion of the shift lever so as to protrude in one direction of the shift directions and the select directions, and the main body includes the guide groove that guides the guide protrusion, and the circular hole in which the spherical proximal end portion is held in position. When the shift lever is operated in any one direction of the shift directions and the select directions, the guide groove guides the guide projection, so as to permit the shift lever to be operated in that direction. When the shift lever is in a neutral position, the interval between a proximal end portion of the guide protrusion and an inner wall of the operating direction guide groove which is opposed to the proximal end portion is larger than the interval between a distal end portion of the guide protrusion and an inner wall of the operating direction guide groove which is opposed to the distal end portion. Therefore, when the shift lever is operated in a direction that intersects with the protruding direction of the guide protrusion, and the spherical proximal end portion is displaced in a radial direction thereof opposite to the operating direction of the shift lever, the proximal end portion of the guide protrusion and the inner wall of the operating direction guide groove which is opposed to the proximal end portion are less likely to or unlikely to contact with each other. Consequently, stress is prevented from being concentrated due to contact of the guide protrusion with the inner wall of the operating direction guide groove.

In the shifting device according to the above aspect of the invention, the inner walls of the operating direction guide groove may be opposed to each other with the guide protrusion interposed therebetween, and the inner walls of the operating direction guide groove may be parallel with each other. A width dimension of the proximal end portion of the guide protrusion which is opposed to the operating direction guide groove may be reduced from the distal end portion of the guide protrusion toward a proximal end of the guide protrusion. With this arrangement, when the shift lever is operated in a direction that intersects with the protruding direction of the guide protrusion, and the spherical proximal portion is displaced in the direction opposite to the operating direction of the shift lever, the proximal end portion of the guide protrusion is less likely or unlikely to contact with the inner walls of the operating direction guide groove which are opposed to the proximal end portion. Consequently, stress is prevented from being concentrated due to contact of the guide protrusion with the inner walls of the operating direction guide groove.

In the shifting device according to the above aspect of the invention, the guide protrusion may have substantially the same width dimension over the distal end portion and the proximal end portion of the guide protrusion. The inner walls of the operating direction guide groove may be opposed to each other with the guide protrusion interposed therebetween, such that an interval between the inner walls of the operating direction guide groove increases from a portion of the operating direction guide groove which is opposed to the distal end portion of the guide protrusion toward a proximal end of the guide protrusion. With this arrangement, when the shift lever is operated in a direction that intersects with the protruding direction of the guide protrusion, the spherical proximal portion is displaced in the direction opposite to the operating direction of the shift lever, so that the proximal end portion of the guide protrusion is less likely or unlikely to contact with the inner walls of the operating direction guide groove which are opposed to the proximal end portion. Consequently, stress is prevented from being concentrated due to contact of the guide protrusion with the inner walls of the operating direction guide groove.

The shifting device as described above may further include a bearing member provided between the circular hole of the main body and the spherical proximal end portion of the shift lever. The bearing member may include a spherical bearing surface configured to slidably contact with the spherical proximal end portion, and the bearing member may be elastically deformable in radial directions of the spherical proximal end portion. With this arrangement, the spherical proximal end portion of the shift lever is slidably received by the spherical bearing surface of the bearing member provided between the circular hole of the main body and the spherical proximal end portion of the shift lever. When the shift lever is operated in a direction that intersects with the protruding direction of the guide protrusion, the spherical proximal end portion that is displaced in the direction opposite to the operating direction of the shift lever receives elastic return force in a direction opposite to the direction of displacement of the spherical proximal end portion, from the bearing member elastically displaced. Thus, stress concentration due to contact of the inner walls of the operating direction guide groove with the guide projection is further prevented.

In the shifting device as described above, the guide protrusion may a square or rectangular flat plate, the guide protrusion may be provided on a partial arch surface of the spherical proximal end portion, the guide protrusion may be provided on a center axis that passes a sphere center of the spherical proximal end portion and passes a widthwise center of the guide protrusion, the guide protrusion may have side faces that are opposed to the inner walls of the operating direction guide groove, and the side faces of the guide protrusion may be axisymmetric with respect to the center axis. With this arrangement, when the shift lever is operated in a direction that intersects with the protruding direction of the guide protrusion, the intervals between the side faces of the guide protrusion and the inner walls of the operating direction guide groove which are opposed to the side faces do not change, irrespective of the inclination of the operating direction of the shift lever, in the distal end portion of the guide protrusion. This makes it easy to assure a high dimensional accuracy between the guide protrusion and the inner walls of the operating direction guide groove which are opposed to the guide projection.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A shifting device for a vehicle according to one embodiment of the invention will be described in detail, with reference to the drawings.

Figure 1:
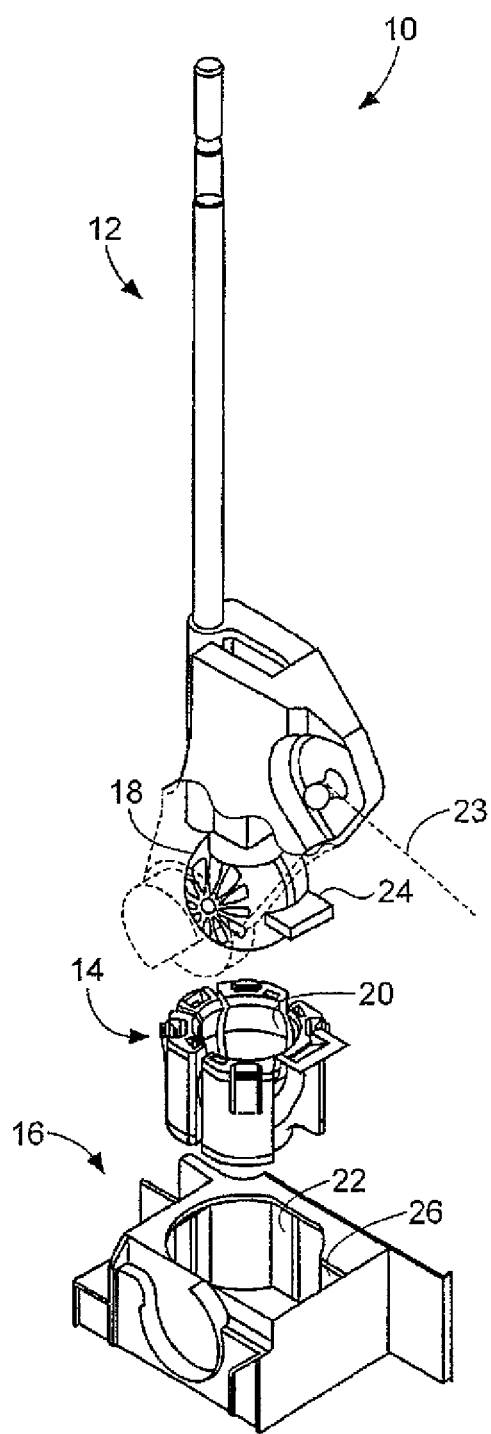
FIG. 1 is a perspective view separately showing a shift lever, a spherical proximal end portion, a bearing member, and a main body, which constitute a shifting device for a vehicle according to one embodiment of the invention.

FIG. 1 is a perspective view showing a shift lever 12, a bearing member 14, and a main body 16, separately, before assembling. The shift lever 12, bearing member 14, and the main body 16 constitute a principal part of a shifting device 10 for a vehicle according to one embodiment of the invention. The shift lever 12 has a spherical proximal end portion 18 at its proximal end, and a knob (not shown) attached to a distal end portion thereof. The bearing member 14 having a cylindrical shape has a spherical bearing surface 20 that slidably contacts with a surface of the spherical proximal end portion 18. The main body 16 has a mounting hole 22 in which the bearing member 14 is fitted, and is fixed to the floor of the vehicle compartment or cabin. The shift lever 12 is erected on the main body 16 such that it is pivotal in shift directions and select directions, about the center of the spherical proximal end portion 18 that is slidably supported by the bearing member 14. A shift cable 23 for transmitting a shifting operation to an automatic transmission is coupled to a proximal end portion of the shift lever 12 to which the spherical proximal end portion 18 is fixed. The spherical proximal end portion 18 has a guide protrusion 24 in the form of a rectangular flat plate, which protrudes from its surface toward the rear of the vehicle, namely, in an operating direction as one of shift directions of the shift lever 12. The main body 16 has a guide groove 26 in the shape of a rectangular parallelepiped, which is formed by recessing the inner wall of the mounting hole 22 in the above-indicated one of the shift directions. The guide protrusion 24 is guided by the guide groove 26, such that the shift lever 12 is permitted to be operated in the shift directions and select directions, while the shift lever 12 is prevented from rotating about its axis.

Figure 2:
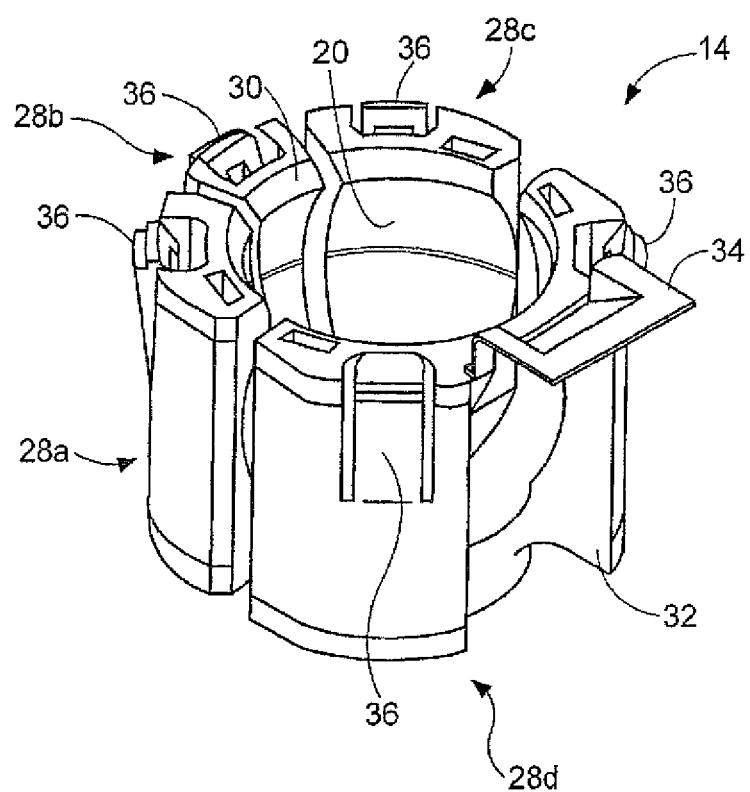
FIG. 2 is an enlarged, perspective view showing the bearing member of FIG. 1.

FIG. 2 is an enlarged, perspective view showing the bearing member 14. The bearing member 14 has four split members 28a through 28d formed of polyacetal resin, for example. The split members 28a-28d are assembled together so that their arc-shaped inner walls that are convexed radially outwards, in a condition where the spherical proximal end portion 18 is fitted in the bearing member 14, provide a spherical inner wall, namely, the spherical bearing surface 20 that slidably receives the spherical proximal end portion 18. The bearing member 14 is also provided in its upper part with an opening 30 through which the shift lever 12 is projected from the spherical proximal end portion 18. A cutout 32 is formed in the split member 28d located on one side of the shifting direction of the shift lever 12, i.e., on the rear side of the vehicle. The cutout 32 permits the guide protrusion 24 to be guided into the guide groove 26 of the main body 16, without being interrupted by the bearing member 14. A cover 34 is provided above the cutout 32, for connecting circumferentially opposite end portions of the bearing member 14 which define the cutout 32 therebetween, so as to increase the strength of the split member 28d around the cutout 32. Each of the split members 28a-28d is provided with at least one claw portion 36 that faces side walls of its outer periphery, and a total of five claw portions 36 are provided in the bearing member 14. In a condition where the spherical proximal end portion 18 is received on the spherical bearing surface 20, the claw portions 36 enable the bearing member 14 to be elastically deformed in radial directions of the spherical proximal end portion 18, relative to the main body 16. One of the claw portions 36 is located on the front side of the vehicle, and two, out of the remaining four claw portions 36, are located at right and left, diagonally forward positions (45 degrees as measured from a line that passes the center of the bearing member 14 and extends in the lateral direction of the vehicle) such that the claw portion 36 located on the front side of the vehicle is interposed between the right and left claw portions 36. Further, the remaining two claw portions 36 are located at right and left diagonally backward positions (45 degrees as measured from the above-mentioned line of the bearing member 14).

Figure 3:
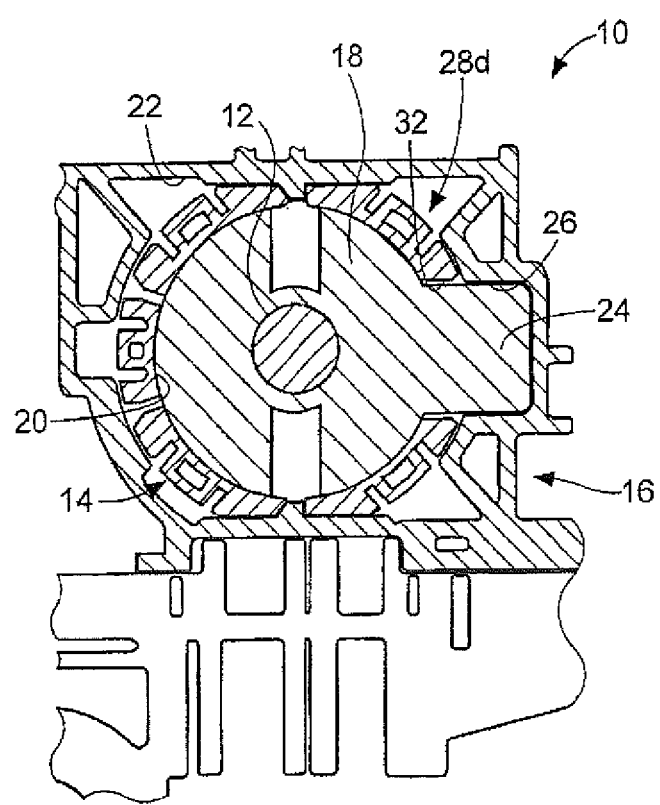
FIG. 3 is a cross-sectional view as viewed in a plane obtained by cutting a guide protrusion in the form of a rectangular flat plate of the spherical proximal end portion of FIG. 1, in a horizontal direction.

FIG. 3 is a cross-sectional view as seen in a plane obtained by cutting the guide protrusion 24 in the form of a rectangular flat plate of the spherical proximal end portion 18 of the shift lever 12, in, the horizontal direction. The spherical proximal end portion 18 is mounted in the main body 16 via the bearing member 14. The guide protrusion 24 of the spherical proximal end portion 18 protrudes from the cutout 32 provided in the split member 28d on the rear side of the vehicle, such that side faces of the guide protrusion 24 are opposed to, inner walls of the guide groove 26 of the main body 16. The intervals or clearances between the side faces of the guide protrusion 24 and the inner walls of the guide grooves 26 are made sufficiently small, so that backlash between the guide protrusion 24 and the guide groove 26 of the main body 16 is reduced. The guide protrusion 24 in the form of the flat plate protrudes from the spherical proximal end portion 18 toward the rear of the vehicle, in a direction substantially perpendicular to the axis of the shift lever 12.

Figure 4:
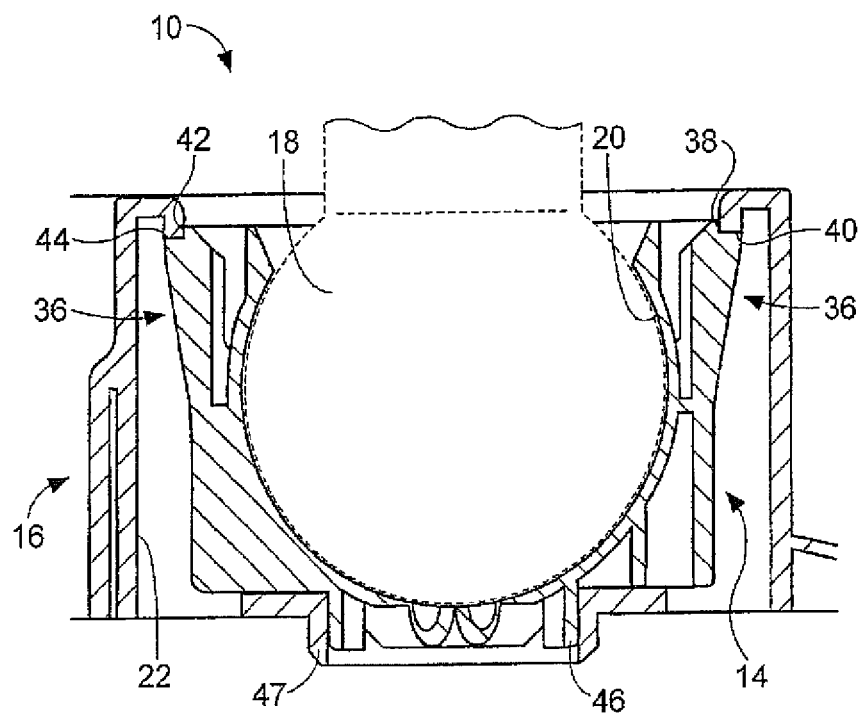
FIG. 4 is a cross-sectional view taken in a plane that passes claw portions provided in the bearing member of FIG. 1 and is perpendicular to the horizontal plane.

FIG. 4 is a cross-sectional view taken in a plane that passes the claw portions 36 provided in the bearing member 14 and is perpendicular to the horizontal plane. The bearing member 14 that receives the spherical proximal end portion 18 on the spherical bearing surface 20 is mounted on the main body 16, such that the diameter of its pre-loading contact face 38 is made smaller than that of the pre-loading contact face 38 in a condition where the bearing member 14 is not mounted on the main body 16, namely, the pre-loading contact face 38 and a retaining contact face 40 of the bearing member 14 abut against a pre-loading contact face 42 and a retaining contact face 44 of the main body 16, in a condition where the claw portions 36 are deflected radially inwards. Therefore, the bearing, member 14 is pre-compressed radially inwards by the pre-loading contact face 42 of the main body 16, due to elastic return force of the claw portions 36. The bearing member 14 mounted on the main body 16 is elastically displaceable, relative to the main body 16, in radial directions in which the elastic return force of the claw portions 36 increases, namely, in directions in which the deflection of the claw portions 36 increases. Also, a fitting portion 46 of the bearing member 14 is fastened to and fitted in a recessed portion 47 of the main body 16.

Figure 5:
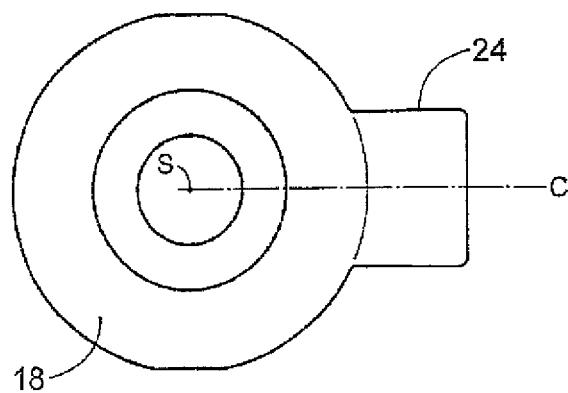
FIG. 5 is a plan view showing the spherical proximal end portion of FIG. 1, along with its sphere center and a center axis that passes the widthwise center of the guide protrusion.

FIG. 5 is a plan view showing the spherical proximal end portion 18 of the shift lever 12, along with a center axis C that passes its sphere center S and the center of the guide protrusion 24 as viewed in the width direction. The spherical proximal end portion 18 is formed of nylon resin reinforced by glass fibers, for example. The guide protrusion 24 is in the form of a rectangular flat plate having side faces that are opposed to the inner walls of the guide groove 26. The guide protrusion 24 is provided on a partial arch surface of the spherical proximal end portion 18 and is provided on a center axis C that passes the sphere center S of the spherical proximal end portion 18 and passes the widthwise center of the guide protrusion 24. The side faces of the guide protrusion 24 are axisymmetric with respect to the center axis C.

Figure 6:
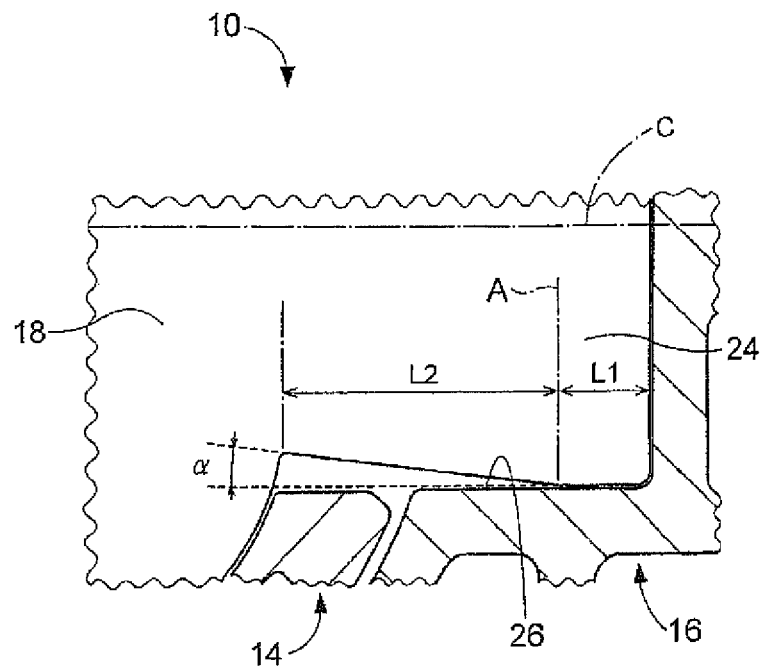
FIG. 6 is an enlarged cross-sectional view showing the guide protrusion of the spherical proximal end portion and its vicinity, along with the bearing member and the main body, when the shift lever of FIG. 1 is not operated in one of select directions.

FIG. 6 is an enlarged cross-sectional view showing the guide protrusion 24 of the spherical proximal end portion 18 and its vicinity, along with the bearing member 14 and the main body 16, in a condition where the shift lever 12 is not operated to one of the select directions. The inner walls of the guide groove 26 of the main body 16, which are opposed to each other with the guide protrusion 24 interposed therebetween, are mutually parallel faces, and an interval between the inner walls is equal when viewed in the direction of the widthwise center axis C of the guide protrusion 24. In a distal end portion of the guide protrusion 24 of the spherical proximal end portion 18, which extends over a given length L1 from the distal end of the guide protrusion 24 to a given position A in a direction toward the sphere center, the side faces of the guide protrusion 24 are formed in parallel with the mutually parallel inner walls of the guide groove 26, so that the interval between each inner wall of the guide groove 26 of the main body 16 and the opposed side face of the guide protrusion 24 is equal to a constant distance. The distance between the inner wall and the side face is small enough to prevent the wall and face from interfering with each other when the shift lever 12 is operated in one of the shift directions, and curb or inhibit rotation of the shift lever 12 about its axis without causing the sense of rattling. Namely, the side faces of the guide protrusions 24 are formed so that the interval between the distal end portion of the guide protrusion 24 having the given length L1, in which the guide protrusion 24 has the largest width dimension, and each of the inner walls of the guide groove 26 opposed to the side faces of the guide protrusion 24, is kept equal to the above-mentioned constant distance. In a proximal end portion of the guide protrusion 24 that extends from the given position A over a given length L2, the guide protrusion 24 is formed so as to be smaller from the given position A toward the proximal end portion, so that an angle formed between a line that is parallel to the center axis C of the guide protrusion 24 and extends from the given position A toward the sphere center S side as an extension of a line on the side face of the distal end portion of the guide protrusion 24 having the given length L1, and a line on the side face of the proximal end portion of the guide protrusion 24 having the given length L2, which extends from the given position A to the proximal end, becomes equal to a given angle $\alpha$. Namely, the guide protrusion 24 is formed in a tapered shape, so that the interval between the side face of the proximal end portion of the guide protrusion 24 having the given length 12 and extending from the given position A, and the inner wall of the guide groove 26 which is opposed to the side face, becomes larger than the interval between the side face of the distal end portion of the guide protrusion 24 having the given length L1 and extending from the given position A and the inner wall of the guide groove 26 which is opposed to the side face. The given angle $\alpha$ is determined so that the guide protrusion 24 of the spherical proximal end portion 18 does not strongly interfere with the inner walls of the main body 16, even if the bearing member 14 is elastically displaced to the maximum, up to the displacement limit, in radial directions relative to the main body 16, and the spherical proximal end portion 18 received in the bearing member 14 is displaced radially outwards to the maximum. Thus, stress is prevented from being concentrated in the proximal end portion of the guide protrusion 24.

Figure 7:
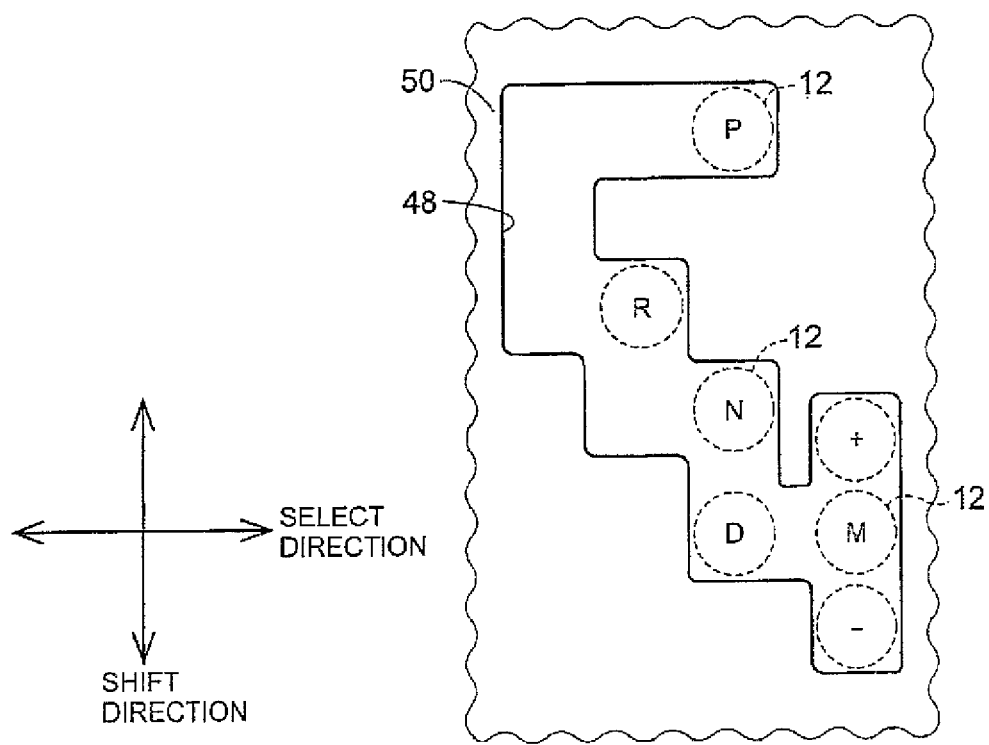
FIG. 7 is a view schematically showing a shift gate used in the vehicular shifting device of FIG. 1.

FIG. 7 is a view schematically showing the configuration of a shift gate 50 as a plate-like member. The shift gate 50 has a guide hole 48 through which the shift lever 12 is passed, and serves to guide the shift lever 12 to a selected one of P, R, N, D, M, +, – positions. The shift gate 50 is installed in the vehicle interior so that the shift directions in FIG. 7 correspond to the front-back direction of the vehicle, and the shift lever 12 is erected in the vehicle interior, via the shift gate 50, such that the shift lever 12 can be operated in the shift directions and the select directions.

Figure 8:
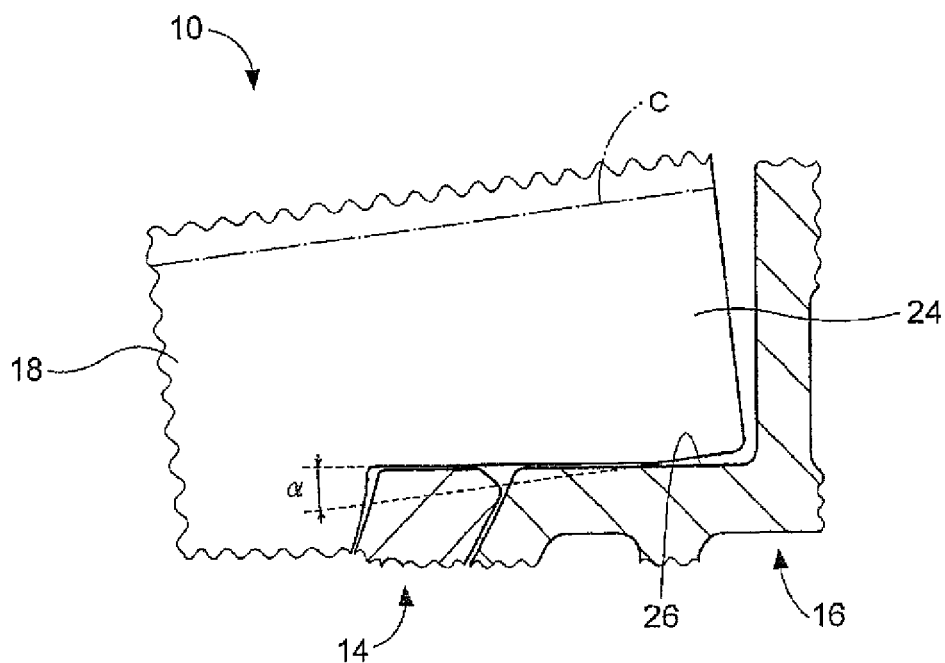
FIG. 8 is a view showing the positional relationship between a side face of the guide protrusion of the spherical proximal portion and an inner wall of the guide groove of the main body when the shift lever of FIG. 1 is operated in one of the select directions, and the sphere center of the spherical proximal portion is displaced in a direction opposite to the select direction.

FIG. 8 shows the positional relationship between one of the side faces of the guide protrusion 24 of the spherical proximal end portion 18 and the corresponding inner wall of the guide groove 26 of the main body 16, when the shift lever 12 is operated to one operating end in the right direction of the vehicle, i.e., one of the select directions, and the sphere center of the spherical proximal end portion 18 is displaced in a direction opposite to the select operating direction. The spherical proximal end portion 18 is displaced in the direction opposite to the select operating direction, to the limit of radial displacement of the bearing member 14. Thus, even if the spherical proximal end portion 18 is displaced in the direction opposite to the select operating, direction, the proximal end portion of the guide protrusion 24 having the given length L2 and extending from the given position A does not strongly interfere with the inner wall of the main body 16 though they are close to each other, since the guide protrusion 24 is formed in a tapered shape. More specifically, the guide protrusion 24 is tapered so that the angle between an extended line that extends from the side face of the distal and portion of the guide protrusion 24 of the spherical proximal end portion 18, from the given position A toward the sphere center S, and a line on the side face of the proximal end portion of the guide protrusion 24 extending from the given position A, becomes equal to $\alpha$.

As described above, according to the vehicular shifting device 10 of this embodiment, the guide protrusion 24 protrudes toward the rear of the vehicle, or in one of the shift directions, from the spherical proximal end portion 18 of the shift lever 12, and the guide groove 26 is provided in the main body 16 that holds the spherical proximal end portion 18 in the circular hole, for guiding the guide protrusion 24 so as to permit the shift lever 12 to be operated in one of the shift directions and select directions while preventing rotation thereof about its axis. When the shift lever 12 is not operated in any of the select directions, or placed in the neutral position, the intervals between the side faces of the proximal end portion of the guide protrusion 24 extending from the given position A in the direction of the center axis C of the guide protrusion 24, and the opposed inner walls of the guide groove 26, are larger than the intervals between the side faces of the distal end portion of the guide protrusion 24 extending from the given position A and the opposed inner walls of the guide groove 26. Therefore, even when the shift lever 12 is operated to an operating end in one of the select directions, and the spherical proximal end portion 18 is displaced in a radial direction corresponding to the direction opposite to the operating direction of the shift lever 12, the side faces of the proximal end portion of the guide protrusion 24 and the opposed inner walls of the guide groove 26 of the main body 16 are inhibited from strongly interfering with each other. Thus, stress is prevented from being concentrated due to contact between the inner walls of the guide groove 26 and the guide protrusion 24.

According to the vehicular shifting device 10 of this embodiment, the inner walls of the guide groove 26 of the main body 16, which are opposed to each other with the guide protrusion 24 interposed therebetween, are parallel to each other. In the proximal end portion of the guide protrusion 24 extending from the given position A in the direction of the center axis C of the guide protrusion 24, the guide protrusion 24 is formed with the width dimension that is reduced from the given position A to the proximal end, so that the angle formed between a line that is parallel to the center axis C of the guide protrusion 24 and extends from the given position A to the proximal end as an extension of the line on the side face of the distal end portion of the guide protrusion 24, and a line on the side face of the proximal end portion of the guide protrusion 24 extending from the given position A, becomes equal to the given angle $\alpha$. Therefore, even when the shift lever 12 is operated in one of the select directions to the operating end at which the lever 12 hits against the shift gate 50, and the spherical proximal end portion 18 is displaced in a radial direction corresponding to the direction opposite to the select operating direction, the side faces of the proximal end portion of the guide protrusion 24 and the opposed inner walls of the guide groove 26 are inhibited from strongly contacting with each other. Consequently, stress is prevented from being concentrated due to contact between the inner walls of the guide groove 26 and the guide protrusion 24.

According to the vehicular shifting device 10 of this embodiment, the bearing member 14 is interposed between the mounting hole 22 of the main body 16 and the spherical proximal end portion 18 of the shift lever 12. The bearing member 14 has the spherical bearing surface 20 that slidably contacts with the spherical proximal end portion 18, and is elastically displaceable in radial directions. Therefore, the spherical proximal end portion 18 of the shift lever 12 can be slidably received by the spherical bearing surface 20 of the bearing member 14 interposed between the mounting hole 22 of the main body 16 and the spherical proximal end portion 18 of the shift lever 12. When the shift lever 12 is operated to its operating end in one of the select directions, and the spherical proximal end portion 18 is displaced in a radial direction corresponding to the direction opposite to the select operating direction of the shift lever 12, the spherical, proximal end portion 18 receives elastic return force in the direction opposite to the direction of displacement of the spherical proximal end portion 18, from the bearing member 14 that is elastically displaced. Thus, stress is further prevented from being concentrated due to contact between the inner walls of the guide groove 26 and the guide protrusion 24.

According to the vehicular shifting device 10 of this embodiment, the guide protrusion 24 is in the form of a rectangular flat plate having side faces that are opposed to the inner walls of the guide groove 26. The guide protrusion 24 is provided on a partial arch surface of the spherical spherical proximal end portion 18 and is provided on a center axis C that passes the sphere center S of the spherical proximal end portion 18 and passes the widthwise center of the guide protrusion 24. The side faces of the guide protrusion 24 are axisymmetric with respect to the center axis C. Therefore, the intervals between the guide protrusion 24 and the opposed inner walls of the guide groove 26 do not change in the distal end portion of the guide protrusion 24 extending from the given position A, irrespective of the inclination of the select direction of the shift lever 12. It is thus easy to assure high dimensional accuracy between the guide protrusion 24 and the inner walls of the guide groove 26 opposed to the guide protrusion 24.

Next, another embodiment of the invention will be described. In the following embodiment; the same reference numerals are assigned to portions that are substantially identical with those of the illustrated embodiment, and these portions will not be described in detail.

A shifting device 52 for a vehicle is substantially identical with the vehicular shifting device 10 as described above, except the shape of a guide protrusion 54 of the spherical proximal end portion 18, and the shape of inner walls of a guide groove 56 of the main body 16 which are opposed to side faces of the guide protrusion 54. Accordingly, the vehicular shifting device 52, more specifically, the guide protrusion 54 that projects toward the rear of the vehicle from the spherical proximal end portion 18, and the inner walls of the guide groove 56 of the main body 16 located in the vicinity of the guide protrusion 54 will be described in detail with reference to FIG. 9.

Figure 9:
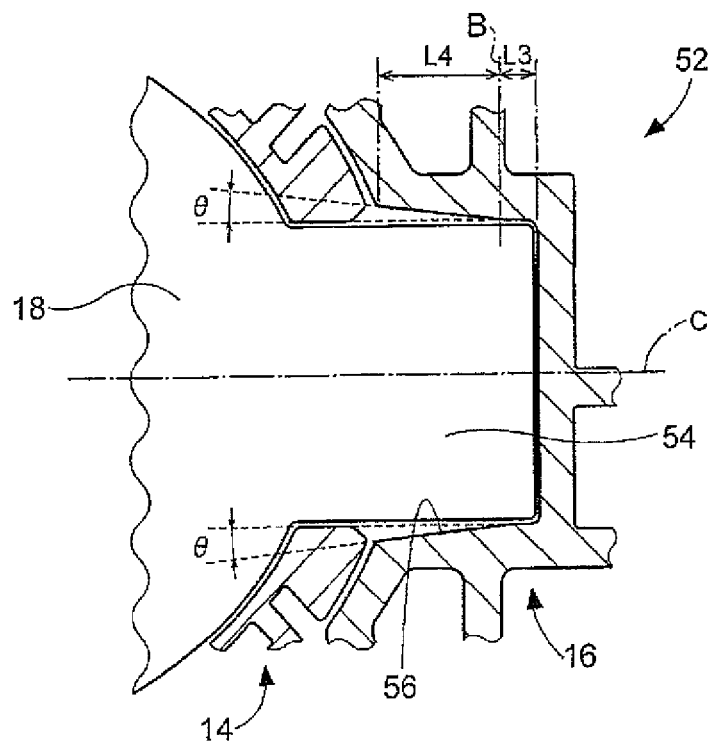
FIG. 9 is an enlarged cross-sectional view showing a guide protrusion of a spherical proximal end portion and its vicinity, along with a bearing member and a main body, when a shift lever of a shifting device for a vehicle according to another embodiment of the vehicle is not operated in one of select directions.

FIG. 9 is an enlarged cross-sectional view showing the guide protrusion 54 of the spherical proximal end portion 18 and its vicinity, along with the bearing member 14 and the main body 16, when the shift lever 12 of the vehicular shifting device 52 is not operated in one of the select directions. The guide protrusion 54 is a rectangular flat plate and protrudes toward the rear of the vehicle from the spherical proximal end portion 18. The guide protrusion 54 is provided on a partial arch surface of the spherical proximal end portion 18. The guide protrusion 54 has side faces which are opposed to inner walls of the guide groove 56 of the main body 16 and end faces of the bearing member 14 which face the cutout 32. The guide protrusion 54 is provided, on a center axis C that is a line that passes the sphere center of the spherical proximal end portion 18 and passes the widthwise center of the guide protrusion 54. The width dimension from the distal end portion to proximal end portion of the guide protrusion 54 as viewed in the direction of the center axis C is constant. The inner walls of the guide groove 56 of the main body 16 are formed in parallel with the parallel side faces of the guide protrusion 54, from the position remotest from the sphere center of the spherical proximal end portion 18, to a given position B that is closer to the sphere center by a given length L3 in the direction of the center axis C, so that an interval between each of the inner walls of the guide groove 56 and the corresponding side face of the guide protrusion 54 is equal to a constant distance. The distance between the inner wall of the guide groove 56 and the side face of the guide protrusion 54 is small enough to prevent these wall and face from interfering with each other when the shift lever 12 is operated in one of the shift directions, and curb or inhibit rotation of the shift lever 12 about its axis without causing the sense of ratting. Namely, the inner walls of the guide groove 56 are formed so that the interval between the distal end portion of the guide protrusion 54 having the largest width dimension and a given length L3, and each inner, wall of the guide groove 56 opposed to the side faces of the guide protrusion 54, is equal to the above-mentioned constant distance. In a portion of the guide groove 56 from the given position B to the opening of the groove 56, the interval between the inner walls of the guide groove 56 opposed in a direction perpendicular to the center axis C is increased from the given position B toward the opening, so that an angle formed between a line extended from a line on the inner wall of the guide groove 56 from the given position B, toward the sphere center S of the spherical proximal end portion 18, and a line on the inner wall of the guide groove 56 corresponding to the distal end side of the guide protrusion 54 from the given position B, is equal to angle θ. Namely, the inner walls of the guide groove 56 are formed in a tapered shape, such the interval between the inner walls of the guide groove 56 which extend from the given position B toward the sphere center S and are opposed to each other with the guide protrusion 54 interposed therebetween increases from a portion opposed to the distal end portion of the guide protrusion 54 to a portion opposed to the proximal end portion of the guide protrusion 54. The above-mentioned given angle θ is determined so that the side faces of the guide protrusion 54 of the spherical proximal end portion 18 do not strongly interfere with the inner walls of the guide groove 56 of the main body 16, even if the bearing member 14 is elastically displaced to the maximum, to the limit of displacement in the radial directions relative to the main body 16, and the spherical proximal end portion 18 received in the bearing member 14 is displaced radially outwards to the maximum.

Figure 10:
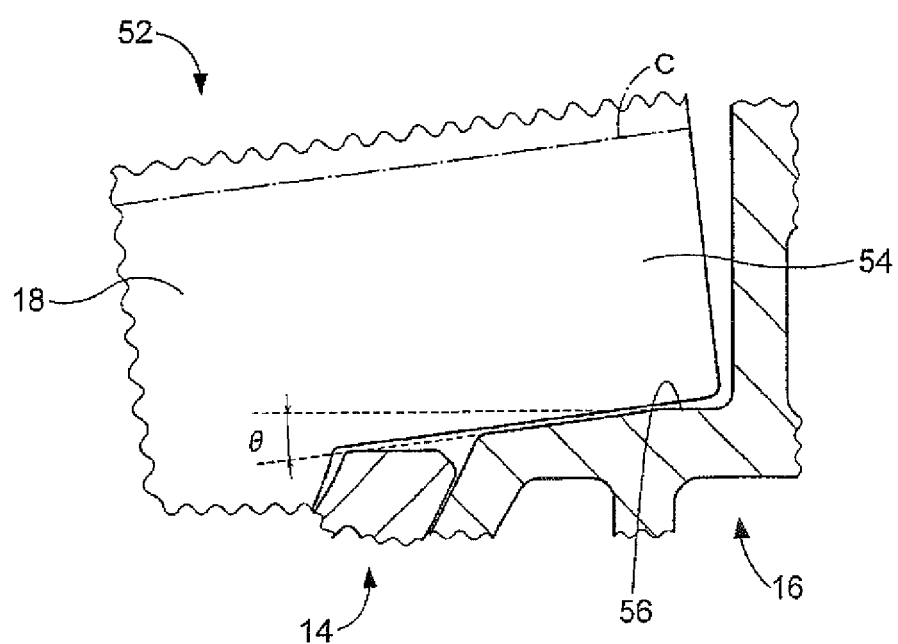
FIG. 10 is a view showing the positional relationship between a side face of the guide protrusion of the spherical proximal portion and an inner wall of the guide groove of the main body when the shift lever of FIG. 9 is operated in one of the select directions, and the sphere center of the spherical proximal portion is displaced in a direction opposite to the select direction.

FIG. 10 shows the positional relationship between one of the side faces of the guide protrusion 54 of the spherical proximal end portion 18 and the corresponding inner wall of the guide groove 56 of the main body 16 when the shift lever 12 of the vehicular shifting device 52 is operated to an operating end in the right direction of the vehicle, or one of the select directions, and the center of the spherical proximal end portion 18 is displaced in a direction opposite to the select operating direction. The spherical proximal end portion 18 is displaced in a radial direction opposite to the select direction, to the limit of radial displacement of the bearing member 14. Thus, even if the spherical proximal end portion 18 is displaced in the direction opposite to the select direction, the inner wall of the guide groove 56 of the main body 16 in its portion extending from the given position B to the opening of the groove 56, rather than the deepest portion of the groove 56, gets close to the side face of the guide protrusion 54, but does not strongly interfere with the side face. This is because the guide groove 56 is formed in a tapered shape, such that an angle formed between a line that is extended from a line on the inner wall of the guide groove 56 from the deepest portion of the guide groove 56 to the given position B, toward the sphere center S, and a line on the inner wall of the guide groove 56 closer to the sphere center S than the given position B, becomes equal to θ.

As described above, according to the vehicular shifting device 52 of this embodiment, the guide protrusion 54 has the same width dimension from its distal end portion to its proximal end portion. In the portion of the guide groove 56 from the given position B to the opening thereof, the interval between the inner walls of the guide groove 56 between which the guide protrusion 54 is interposed is increased from a portion opposed to the distal end portion of the guide protrusion 54 to a portion opposed to the proximal end portion of the guide protrusion 54, so that the angle formed between the line extended from the line on the inner wall of the guide groove 56 having the given length L3 and corresponding to the distal end side of the guide protrusion 54, from the given position B of the guide groove 56 toward the sphere center S, and the line on the inner wall of the guide groove 56 having the given length L4 and extending from the given position B to the opening of the guide groove 56 becomes equal to angle θ. Therefore, even when the shift lever 12 is operated to the operation end in one of the select directions that intersects with the direction of protrusion of the guide protrusion 54, and the spherical proximal end portion 18 is displaced in a radial direction corresponding to the direction opposite to the select operating direction of the shift lever 12, the side face of the proximal end portion of the guide protrusion 24 and the inner wall of the guide groove 56 opposed to the side face are inhibited from strongly contacting with each other. Thus, stress is prevented from being concentrated due to contact between the inner walls of the guide groove 56 and the guide protrusion 54.

Also, according to the vehicular shifting device 52 of this embodiment, when the shift lever 12 is operated, to an operating end in one of the select directions, the spherical proximal end portion 18 receives elastic return force in one of the select directions, from the bearing member 14 that is elastically displaced in the direction opposite to the above-indicated one of the select direction, as in the above-described embodiment. Consequently, stress is further prevented from being concentrated due to contact between the inner walls of the guide groove 56 and the guide protrusion 54.

Also, according to the vehicular shifting device 52 of this embodiment, the intervals between the guide protrusion 54 and the opposed inner walls of the guide groove 56 corresponding to a distal end portion of the guide protrusion 54 extending from the given position B do not change irrespective of the inclination of the select direction of the shift lever 12. It is thus easy to assure high dimensional accuracy between the guide protrusion 54 and the opposed inner walls of the guide groove 56.

While the invention has been described in detail with reference to the drawings, the invention may also be embodied in different forms, with various changes added without departing from the principle of the invention.

For example, in the vehicular shifting device 10 of the first embodiment and the vehicular shifting device 52 of the second embodiment, the guide protrusion 24, 54 is formed so as to protrude toward the rear of the vehicle, or in one of the shift directions. However, the invention is not limited to this arrangement, but the guide protrusion 24, 54 may be formed so as to protrude toward the front of the vehicle, or in the other of the shift directions, or in one or the other of the select directions. Namely, if the guide protrusion 24, 54 formed so as to protrude in one of the shift directions or one of the select directions, or the inner walls of the guide groove 26, 56 which are opposed to each other with the guide protrusion 24, 54 interposed therebetween, is/are appropriately formed in a tapered shape, as in the first embodiment or the second embodiment, stress is prevented from being concentrated in the guide protrusion 24, 54, due to strong interference with the inner walls of the guide groove 26, 56.

Also, in the shift gate 50 of the vehicular shifting device 10 of the first embodiment and the vehicular shifting device 52 of the second embodiment, the guide hole 48 is not shaped such that the P, R, N, D positions to which the shift lever 12 is guided are arranged in one row in the shift directions. However, the shift gate may be a straight type shift gate in which the P, R, N, D positions are arranged in one row in the shift directions.

What is claimed is:

1. A shifting device for a vehicle, the shifting device comprising:
    a shift lever that is operable in a shift direction and a select direction that intersects with the shift direction, the shift lever including a spherical proximal end portion; and
    a main body that has a circular hole, the main body being configured to hold the shift lever in the circular hole, wherein:
    the shift lever includes a guide protrusion, the guide protrusion being configured to inhibit rotation of the shift lever about an axis of the shift lever, the guide protrusion protruding from the spherical proximal end portion in one direction of the shift direction and the select direction;
    the main body includes an operating direction guide groove, the operating direction guide groove being configured to guide the guide protrusion so as to permit operation of the shift lever when the shift lever is operated; and
    when the shift lever is in a neutral position, an interval between a proximal end portion of the guide protrusion and an inner wall of the operating direction guide groove which is opposed to the proximal end portion is larger than an interval between a distal end portion of the guide protrusion and an inner wall of the operating direction guide groove which is opposed to the distal end portion.

2. The shifting device according to claim 1, wherein:
    the inner walls of the operating direction guide groove are opposed to each other with the guide protrusion interposed between the inner walls of the operating direction guide groove, and the inner walls of the operating direction guide groove are parallel with each other; and
    a width dimension of the proximal end portion of the guide protrusion which is opposed to the operating direction guide groove is reduced from the distal end portion of the guide protrusion toward a proximal end of the guide protrusion.

3. The shifting device according to claim 1, wherein:
the guide protrusion has substantially the same width dimension over the distal end portion and the proximal end portion of the guide protrusion; and
the inner walls of the operating direction guide groove are opposed to each other with the guide protrusion interposed between the inner walls of the operating direction guide groove, such that an interval between the inner walls of the operating direction guide groove increases from a portion of the operating direction guide groove which is opposed to the distal end portion of the guide protrusion toward a proximal end of the guide protrusion.

4. The shifting device according to claim 1, further comprising:
a bearing member provided between the circular hole of the main body and the spherical proximal end portion of the shift lever, the bearing member including a spherical bearing surface configured to slidably contact with the spherical proximal end portion, the bearing member being elastically deformable in radial directions of the spherical proximal end portion.

5. The shifting device according to claim 1, wherein
the guide protrusion is a square or rectangular flat plate,
the guide protrusion is provided on a partial arch surface of the spherical proximal end portion,
the guide protrusion is provided on a center axis that passes a sphere center of the spherical proximal end portion and passes a widthwise center of the guide protrusion,
the guide protrusion has side faces that are opposed to the inner walls of the operating direction guide groove, and
the side faces of the guide protrusion are axisymmetric with respect to the center axis.

* * * * *